Jan. 10, 1961 R. I. MEYERS ET AL 2,967,680
AIRCRAFT LONGITUDINAL CONTROL AUGMENTER
Filed Sept. 2, 1958 2 Sheets-Sheet 1

*INVENTOR.*
RAYMOND I. MEYERS
KENNETH C. KRAMER
BY

INVENTOR.
RAYMOND I. MEYERS
KENNETH C. KRAMER
BY

United States Patent Office 2,967,680
Patented Jan. 10, 1961

2,967,680

AIRCRAFT LONGITUDINAL CONTROL AUGMENTER

Raymond I. Meyers, Rockford, Mich., and Kenneth C. Kramer, Woodland Hills, Calif., assignors to Lear, Incorporated Filed Sept. 2, 1958, Ser. No. 758,205

4 Claims. (Cl. 244—77)

This invention relates to a control apparatus for aircraft and, more particularly, to attitude control augmenting apparatus for such aircraft. With the rapid development of high performance aircraft, the control system which allows the pilot to move the plane's control surfaces has changed considerably. These changes have isolated the aerodynamic forces from the pilot's stick. This invention has been developed to put one of the aerodynamic forces back into the control system so that the pilot is aware through an added stick force gradient that the aircraft is approaching a stall or other critical angle of attack.

Previous systems have in general been of the type which shake the stick when the aircraft has reached a critical angle of attack to warn the pilot to take the corrective action he wishes. The disadvantage of this system is that no automatic corrective action is taken and the warning is an on-off device which is less desirable than a warning system which gradually takes effect to warn the pilot and also takes corrective action.

Other systems have been devised which actually take the corrective action when a plane reaches an undesirable angle of attack, but such systems do not warn the pilot and he has no feel for this action. He must rely upon the instruments to indicate to him what is taking place and if he wishes to override this corrective action, he must throw a manual switch to disconnect the autopilot.

It is, therefore, an object of this invention to provide a control system which will warn the pilot when he approaches a critical angle of attack and will simultaneously take corrective action to keep the aircraft out of the critical angle of attack.

It is another object of this invention to provide a control system which will warn the pilot when the aircraft is approaching critical angle of attack and will take corrective action to avoid such an angle of attack but will allow the pilot to override such corrective action if he wishes, merely by applying sufficient stick force.

Still another object of this invention is to provide an automatic flight control system which can be used as an integral part of a manual control system.

Other objects and advantages will become apparent from the following description when taken in conjunction with the drawing in which.

Figure 1:
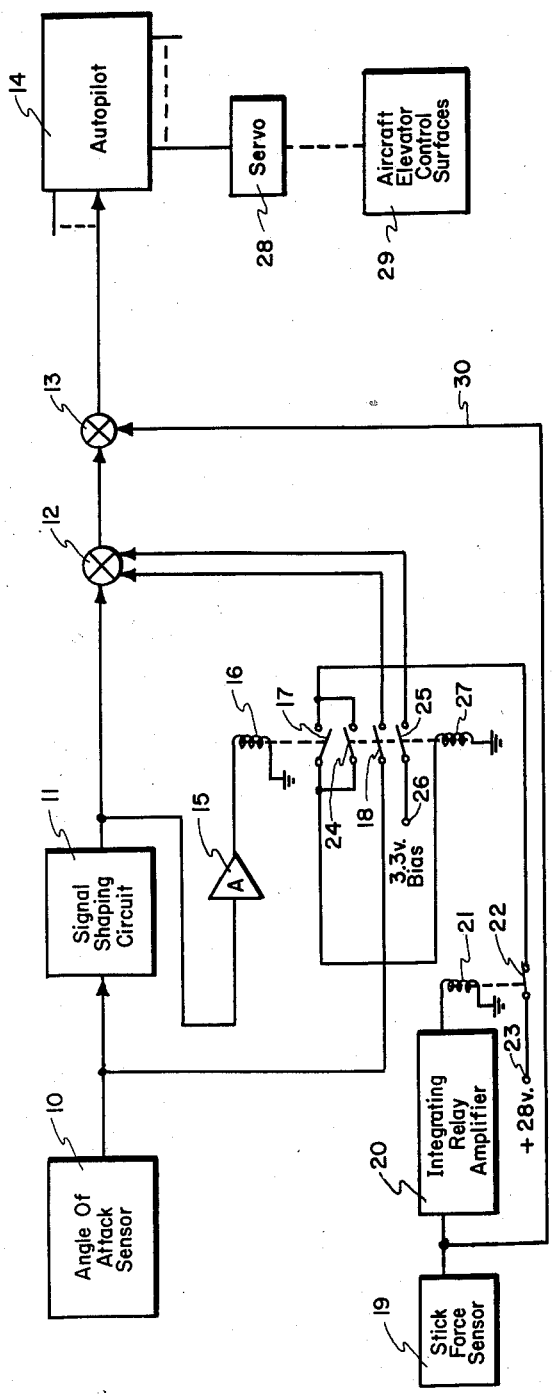
Fig. 1 is a schematic drawing of the invention.
Figure 4:
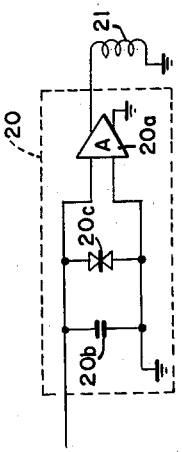
Fig. 4 is a schematic drawing of a typical integrating relay amplifier.

Referring now to Fig. 1, an angle of attack sensor 10, hereinafter referred to as α sensor 10, senses the angle of attack of the aircraft. This may be accomplished conventionally by the use of vanes or pressure differentials such as the type described in U.S. Patent No. 2,626,115, entitled "Aircraft Controls." by J. L. Atwood et al., and issued on January 20, 1955. It is to be noted that the angle of attack is the angle between the aircraft fuselage reference line and the line of flight. A dead band network or signal shaping circuit 11 is electrically connected to and receives any output signals from the α sensor 10. The signal shaping circuit 11 has a preset value such that only electrical signals above a predetermined value will pass through the signal shaping circuit 11. Signal mixers 12 and 13 are electrically connected in series to the shaping circuit 11 and mixer 12 is capable of receiving signals from the shaping circuit 11. Signal mixer 13 is connected to receive the output signals from mixer 12. An autopilot 14 has its pitch axis controls connected to and receives signals from mixer 13. A relay amplifier 15 is also electrically connected to receive the output of shaping circuit 11. A relay 16 is actuated by the output of relay amplifier 15 and in turn actuates switch 17. A switch 18 is electrically connected to the output of sensor 10 and when switch 18 is in the closed position, provides a by-pass for the output of α sensor 10 to the mixer 12. A stick force sensor 19 of the type described in U.S. Patent Number 2,408,770, "Electro Hydraulic Control System," by T. A. Frische et al., and issued on October 8, 1946, senses the pressure applied to the stick control and emits an electrical signal proportional to the pressure applied to the stick. It is understood that wherever the stick control is used, a wheel control may be aptly substituted. An integrating relay amplifier 20, shown in Fig. 4, is connected to and receives the electrical signal emitted by the force sensor 19. Any signal entering the integrating relay amplifier 20 does not pass to the amplifier 20a until the capacitor 20b is fully charged. The double headed Zener diode 20c is connected across the input to the amplifier 20a and chosen of such a value so as to conduct at a given voltage level. It can be seen then that the capacitor 20b integrates the output of the stick force sensor 19 with respect to time and once the capacitor 20b has charged, the signal from the stick force sensor 19 passes to the amplifier 20a. If the signal to the amplifier 20a is above the conductive value of the diode 20c then the diode 20c conducts allowing that portion of the signal above the given value to pass through the diode 20c thereby protecting the amplifier 20a from excessive voltages which might damage the amplifier 20a. A relay 21 is connected and responsive to the output of the amplifier 20a. The stick force sensor output is always fed into mixer 13 regardless of relay 21 and switch 22. The relay 21 is connected to ground and actuates a switch 22. The switch 22 is electrically connected to potential 23, e.g., 28 volts. Switch 24 is an electrical by-pass of switch 17. Switch 25 is electrically connected to a biased voltage terminal 26, e.g., 3.3 volts. The other terminal of switch 25 is electrically connected to mixer 12. Relay 27 is connected to ground at one end of the coil and the other end of the coil is electrically connected in parallel to the switches 17 and 24. The relay 27 actuates switches 18, 24 and 25. A servo 28 is connected and responsive to the output of the pitch axis controls of the autopilot 14. Elevator control surfaces 29 of the aircraft are mechanically connected and responsive to the output of the servo 28.

Figure 2:
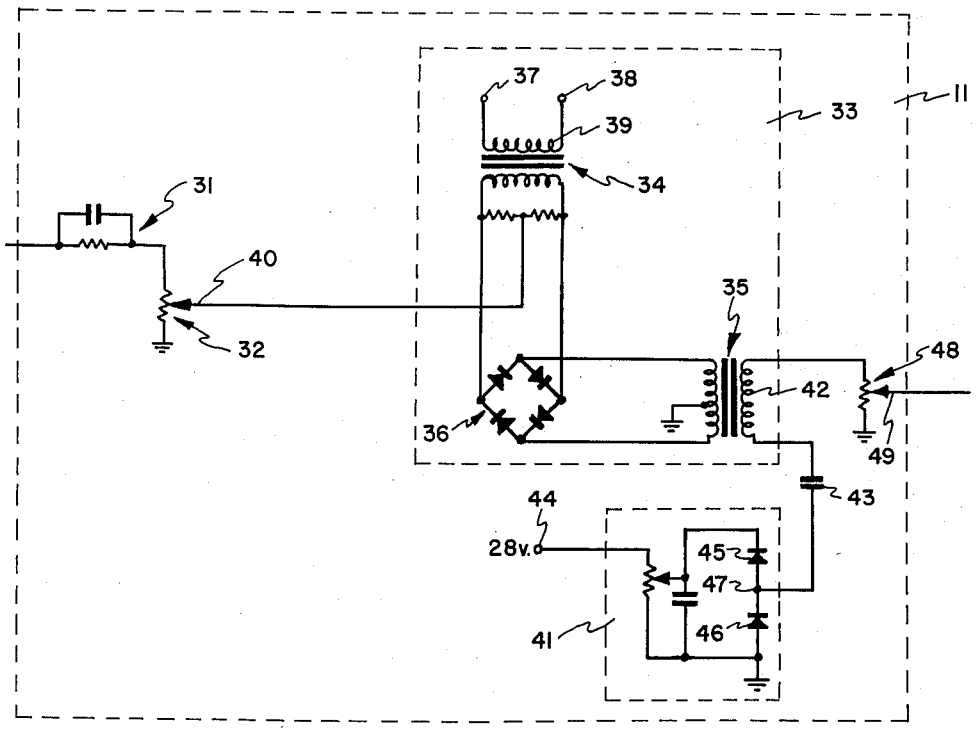
Fig. 2 is a schematic drawing of a typical signal shaping circuit.

Fig. 2 shows the signal shaping circuit in more detail. A resistor capacitor network 31 receives the output of the angle of attack sensor 10 in Fig. 1. A potentiometer 32 is connected to receive the signal from the resistor capacitor circuit 31. A modulating circuit 33 comprises two transformers 34 and 35 and a rectifier 36. An alternating current reference voltage is connected across the terminals 37 and 38 of the primary winding 39 of transformer 34. The modulating circuit 33 is electrically connected to receive the direct current signal picked up by the wiper arm 40 of potentiometer 32. The purpose of the modulating circuit 33 is to change the direct current signal to an alternating circuit signal. A dead band control circuit 41 is connected to one end of the secondary coil 42 of transformer 35 by way of capacitor 43. The purpose of the capacitor 43 is to make the alternating current output of transformer 35 symmetrical. A direct current reference voltage, for example 28 volts, is supplied to the dead band control circuit 41 by way of terminal 44. A pair of limiting diodes 45 and 46 are connected to receive the output of the transformer 35.

It can be seen then that if the direct current reference voltage supplied to the terminal 44 puts a 10 volt bias on the diodes 45 and 46, it will take approximately 10.1 volts at the point 47 before the diodes will conduct. In other words, the diodes set up a dead zone. A potentiometer 48 is connected to the other end of the secondary winding 42 of transformer 35. The wiper arm 49 of potentiometer 48 is capable of picking up a signal from the output of transformer 35 only when the diodes 45 and 46 are in a conducting condition. The output of the potentiometer 48 is transmitted to the mixer 12 and amplifier 15 as shown in Fig. 1. It is understood that other circuits may be substituted for the signal shaping circuit 11 and still obtain the same results.

Figure 3:
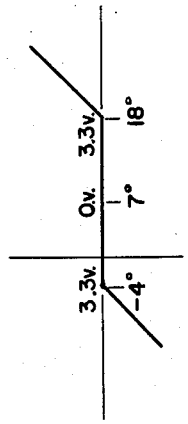
Fig. 3 is a graph showing a typical dead zone of the control system.

In operation the α sensor 10 senses the angle of attack and emits an electrical signal proportional to the angle of attack, e.g., 300 milli-volts per degree. This signal then enters the shaping circuit 11. As shown in Fig. 3, if the angle of attack is below 18 degrees and above 7 degrees, the signal will be between zero volts and 3.3 volts. Such a signal would not pass through the shaping circuit 11 and, therefore, the autopilot 14 receives no signal from the α sensor 10. If the pilot puts a pressure on the stick in the aft direction to urge the plane's nose up, then the pitch axis controls of autopilot 14 receives instructions along lines 30 and through mixer 13 to put the nose of the aircraft up. The relay 21 is also activated causing the switch 22 to open and, therefore, the circuit to the relay 27 is open and only the signal from the force sensor 19 enters the mixer 13 and subsequently autopilot 14. The autopilot 14 in turn relays the signal to the elevator servo 28 which activates the elevator control surface 29.

Now, if the pilot is not exerting a pressure on the stick and the aircraft approaches the critical angle of attack, e.g., 18.1 degrees, the shaping circuit 11 allows a .03 volt signal to pass to the amplifier 15 which in turn energizes relay 16 and closes switch 17. With no pilot effort, switch 22 is closed and, therefore, current may flow from the potential 23 to the relay 27. The relay 27 being energized closes switches 18, 24 and 25. The switch 18 in the closed position effects a by-pass of the shaping circuit 11 to the mixer 12 and allows any signals emanating from the α sensor 10 to pass directly to the mixer 12. The switch 25, also being closed, at the same time allows the biased voltage or nose-up voltage to also pass to the mixer 12. The signals are then compared and the difference passes through the mixer 13 and into the pitch axis controls of autopilot 14 to actuate servo 28. It can be seen then that the angle of attack will be held at, e.g., 18 degrees because if the angle of attack sensor senses an angle below 18 degrees, the signal emanating therefrom will be below 3.3 volts and the difference between it and the 3.3 biased voltage will be a nose-up signal until the aircraft reaches the 18 degree angle of attack at which point the biased voltage and the signal from the α sensor 10 will cancel each other resulting in no signal to the autopilot.

It is to be noted that as soon as switch 18 is closed, the relay 16 is de-energized causing switch 17 to open. However, switch 24 is a by-pass of switch 17 and maintains switches 18 and 25 closed until the pilot exerts a force which opens switch 22.

Consider now that the aircraft is in a critical angle of attack with switches 18 and 25 closed and the pilot exerts a nose-up force on the control stick, such force being large enough to produce a signal to energize the relay 21 and open the switch 22. This immediately opens the switches 18, 24 and 25 causing any signal emitted by the angle of attack sensor to pass through the shaping circuit 11. The signal, if any, emitted by the shaping circuit 11 passes through mixer 12 and into mixer 13 where it is compared with the signal from the stick force sensor 19. The difference of these signals is fed into the pitch axis controls of autopilot 14 to control movement of servo 28. In other words, the shaping circuit 11 emits a signal which will oppose the pilot's efforts. This opposing signal will be proportional to the magnitude of the angle of attack above the safe operating attack angle. The pilot feels a resistive force which warns him of the approaching critical angle of attack and if he wishes to maintain this angle of attack, he must apply a larger force to the stick control. Once the pilot releases the force on the control stick, relay 21 is de-energized closing the switch 22, thereby completing the circuit to the relay 27 which, in turn, operates switches 18, 24 and 25 because switch 17 is closed whenever the shaping circuit 11 emits a signal. The signal emitted by the α sensor 10 will by-pass the shaping circuit 11 and, as described above, will take corrective action to bring the plane back into a safe angle of attack and maintain that safe angle of attack until overridden by the pilot's effort.

It is apparent then that the α sensor 10 automatically keeps the plane from entering a critical angle of attack. However, the pilot still has the option of overriding such corrective action and he realizes he is doing such because of the added force he must apply to the stick in order to obtain his desired result.

Thus far we have discussed only the critical angle of attack with respect to the nose-up condition of the aircraft. The other condition whereby the nose of the aircraft would be down, is exactly opposite and the corrective action is initiated by an out of phase signal from the α sensor 10.

It is apparent that we have provided a control system which warns the pilot when the aircraft is approaching a critical angle of attack by a force gradient on the stick control. The control system also takes corrective action but allows the pilot to override such corrective action if he so wishes. The pilot cannot override the corrective action without realizing he is doing so because of the added force he must apply to the stick control.

Although the present invention has been described with a certain degree of particularity, it is understood that various modifications in the details and arrangements of parts may be had without departing from the spirit and scope of the invention as hereinafter claimed.

We claim:

1. An aircraft longitudinal control augmenter comprising an angle of attack sensor capable of emitting a signal proportional to the angle of attack, an autopilot, first circuit means for applying that portion of said signal to the autopilot which indicates said aircraft is in a critical angle of attack, a control stick force sensor capable of emitting a signal proportional to the force applied to said control stick, second circuit means for comparing said signal from said angle of attack sensor and said signal from said control stick force sensor, and circuit means for transmitting the resultant of said compared signals to said autopilot.

2. An aircraft angle of attack control comprising an angle of attack sensor capable of emitting a signal proportional to the angle of attack of said aircraft, a signal shaping circuit electrically connected to receive signals from said angle of attack sensor, said signal shaping circuit being capable of suppressing signals from said angle of attack sensor which signals are in a given range and indicate flight in a chosen range of angles of attack, an electrical comparing means capable of receiving signals emitted by said signal shaping circuit, a longitudinal control stick force sensor capable of emitting an electrical signal proportional to the force applied to said control stick, relay switching means connected and responsive to signals from said force sensor and said shaping circuit, said switching means when actuated causing a bias voltage to enter said comparing means and an electrical by-pass of said shaping circuit from said angle of attack sensor to said comparing means, and an autopilot electrically connected and responsive to electrical signals from said comparing means.

3. The device as claimed in claim 2 and further comprising an integrating relay amplifier electrically connected to said stick force sensor, said integrating relay amplifier capable of integrating with respect to time said signals from said stick force sensor, and suitable electrical means to transmit said integrated signals to said switching means.

4. An aircraft longitudinal control augmenter comprising an angle of attack sensor capable of emitting a signal proportional to the angle of attack, a signal shaping circuit connected and responsive to signals from said angle of attack sensor, a first relay responsive to signals from said signal shaping circuit, a stick control force sensor capable of emitting an electrical signal proportional to the force applied to said stick, an integrating relay amplifier connected to said stick force sensor, said integrating relay amplifier being capable of integrating with respect to time said signals from said stick force sensor, a second relay responsive to signals from said integrating relay amplifier, switching means mechanically connected to said first and second relays, a first comparing circuit electrically connected to said signal shaping circuit, said switching means when activated causing a biased voltage to be introduced into said first comparing means and a by-pass of said signal shaping circuit from said angle of attack sensor to said first comparing means, a second comparing means electrically connected to said first comparing means and said stick force sensor, and autopilot pitch axis controls electrically connected and responsive to the output of said second comparing means.

References Cited in the file of this patent

UNITED STATES PATENTS

| | | |
|---|---|---|
| 2,566,409 | Greene | Sept. 4, 1951 |
| 2,630,284 | Feeney | Mar. 3, 1953 |
| 2,630,987 | Hauptman | Mar. 10, 1953 |